United States Patent
England

(10) Patent No.: US 7,008,716 B2
(45) Date of Patent: Mar. 7, 2006

(54) GASKET MATERIAL FOR A FUEL CELL

(75) Inventor: Diane M. England, Bloomfield, NY (US)

(73) Assignee: Delphi Technologies, Inc., Troy, MI (US)

(*) Notice: Subject to any disclaimer, the term of this patent is extended or adjusted under 35 U.S.C. 154(b) by 222 days.

(21) Appl. No.: 10/389,452

(22) Filed: Mar. 14, 2003

(65) Prior Publication Data

Related U.S. Application Data

(63) Continuation-in-part of application No. 09/968,270, filed on Oct. 1, 2001, now Pat. No. 6,821,667.

(51) Int. Cl.
*H01M 2/08* (2006.01)
*H01M 2/00* (2006.01)

(52) U.S. Cl. .............................. 429/35; 429/34; 429/36; 429/30; 429/32; 429/12

(58) Field of Classification Search ................. 429/35, 429/34, 36, 30, 32, 12
See application file for complete search history.

(56) References Cited

U.S. PATENT DOCUMENTS

| | | | |
|---|---|---|---|
| 3,615,838 A | 10/1971 | Erickson | |
| 3,844,920 A | 10/1974 | Burgett et al. | |
| 5,100,740 A | 3/1992 | Neugebauer et al. | |
| 5,219,673 A | 6/1993 | Kaun | |
| 5,505,498 A | 4/1996 | Halling et al. | |
| 5,543,239 A | 8/1996 | Virkar et al. | |
| 5,688,610 A | 11/1997 | Spaeh et al. | |
| 6,054,231 A | 4/2000 | Virkar et al. | |
| 6,074,771 A | 6/2000 | Cubukcu et al. | |
| 6,106,966 A | 8/2000 | Crow | |
| 6,106,967 A | 8/2000 | Virkar et al. | |
| 6,326,096 B1 | 12/2001 | Virkar et al. | |
| 6,458,477 B1 | 10/2002 | Hsu | |
| 6,492,053 B1 | 12/2002 | Donelson et al. | |
| 6,537,629 B1 | 3/2003 | Ensinger | |
| 2003/0064612 A1 | 4/2003 | England | |
| 2003/0203267 A1 * | 10/2003 | Chou et al. ................... | 429/35 |

FOREIGN PATENT DOCUMENTS

| | | |
|---|---|---|
| EP | 0283910 | 9/1988 |
| EP | 1 246 283 | 10/2002 |
| EP | 1 298 755 | 4/2003 |
| GB | 2 172 883 | 10/1986 |
| JP | 07014591 | 1/1995 |
| WO | 00/76015 | 12/2000 |
| WO | WO 02/062519 | 8/2002 |
| WO | WO 03/092106 | 11/2003 |

OTHER PUBLICATIONS

S. Simmer et al., Compressive mica seals for SOFC applications, May 15, 2001, J. Power Sources, 102, pp. 310-316.*
Simner, S.P. et al, "Compressive mica seals for SOFC applications", Journal of Power Sources, Elsevier Sequoia S.A. Lausanne, CH, vol. 102, No. 1-2, Dec. 1, 2001.

* cited by examiner

Primary Examiner—Patrick Joseph Ryan
Assistant Examiner—Angela J. Martin
(74) Attorney, Agent, or Firm—Paul L. Marshall

(57) ABSTRACT

A solid-oxide fuel cell system comprising a plurality of components having mating ports therebetween, the port interfaces being sealed by gaskets that include fluorophlogopite mica (F-mica).

8 Claims, 1 Drawing Sheet

GASKET MATERIAL FOR A FUEL CELL

CROSS REFERENCE TO RELATED APPLICATIONS

This application is a continuation-in-part of prior U.S. Non-Provisional patent application Ser. No. 09/968,270 entitled Fuel Cell Stack Having Foil Interconnects and Laminated Spacers, filed Oct. 1, 2001, now U.S. Pat. No. 6,821,667.

TECHNICAL FIELD

The present invention relates to fuel cells; more particularly, solid-oxide fuel cell assemblies which operate at elevated temperatures; and most particularly, to gasket material for sealing joints between components of such fuel cell assemblies.

BACKGROUND OF THE INVENTION

Fuel cells for combining hydrogen and oxygen to produce electricity are well known. A known class of fuel cells includes a solid oxide electrolyte layer through which oxygen anions migrate; such fuel cells are referred to in the art as "solid-oxide" fuel cells (SOFCs).

In some applications, for example, as an auxiliary power unit (APU) for an automotive vehicle, an SOFC is preferably fueled by "reformate" gas, which is the effluent from a catalytic gasoline oxidizing reformer. Reformate typically includes amounts of carbon monoxide (CO) as fuel in addition to molecular hydrogen. The reforming operation and the fuel cell operation may be considered as first and second oxidative steps of the liquid hydrocarbon, resulting ultimately in water and carbon dioxide. Both reactions are exothermic, and both are preferably carried out at relatively high temperatures, for example, in the range of 700° C. to 1000° C.

A complete fuel cell assembly comprises a plurality of components and sub-assemblies joined together mechanically to provide the desired flow paths and control pathways for the liquid hydrocarbon, reactive gases, spent gases, and cooling gases. It is essential that the joints or interfaces between the components and sub-assemblies be durably leak-free at temperatures from below 0° C. to as high as 1000° C., at pressures from subatmospheric to up to several atmospheres. Such conditions place very high demands on materials selected for gaskets at these joints and interfaces.

It is known to use various glass and ceramic compositions as sealants. However, a drawback is that such sealants, though effective, tend to be quite brittle and are easily fractured in assembly or in use. Further, typically they require high-temperature sintering during manufacture of a fuel cell system, which adds difficulty and cost.

What is needed is a material for gasketing in an SOFC system which is thermally stable over the range between shutdown and operating temperatures for both the reformer and the fuel cell assembly; which is chemically stable in oxidizing and reducing environments; which is more robust during assembly and during operation of the system; which is compatible with other materials of the system; and which is relatively inexpensive.

It is a principle object of the present invention to provide an improved material for gasketing joints and seals in a fuel cell assembly.

SUMMARY OF THE INVENTION

Briefly described, in a solid-oxide fuel cell assembly comprising a plurality of components having mating ports therebetween, the port interfaces are sealed by gaskets that include fluorophlogopite mica (F-mica).

BRIEF DESCRIPTION OF THE DRAWINGS

These and other features and advantages of the invention will be more fully understood and appreciated from the following description of certain exemplary embodiments of the invention taken together with the accompanying drawings, in which.

DESCRIPTION OF THE PREFERRED EMBODIMENTS

Figure 1:
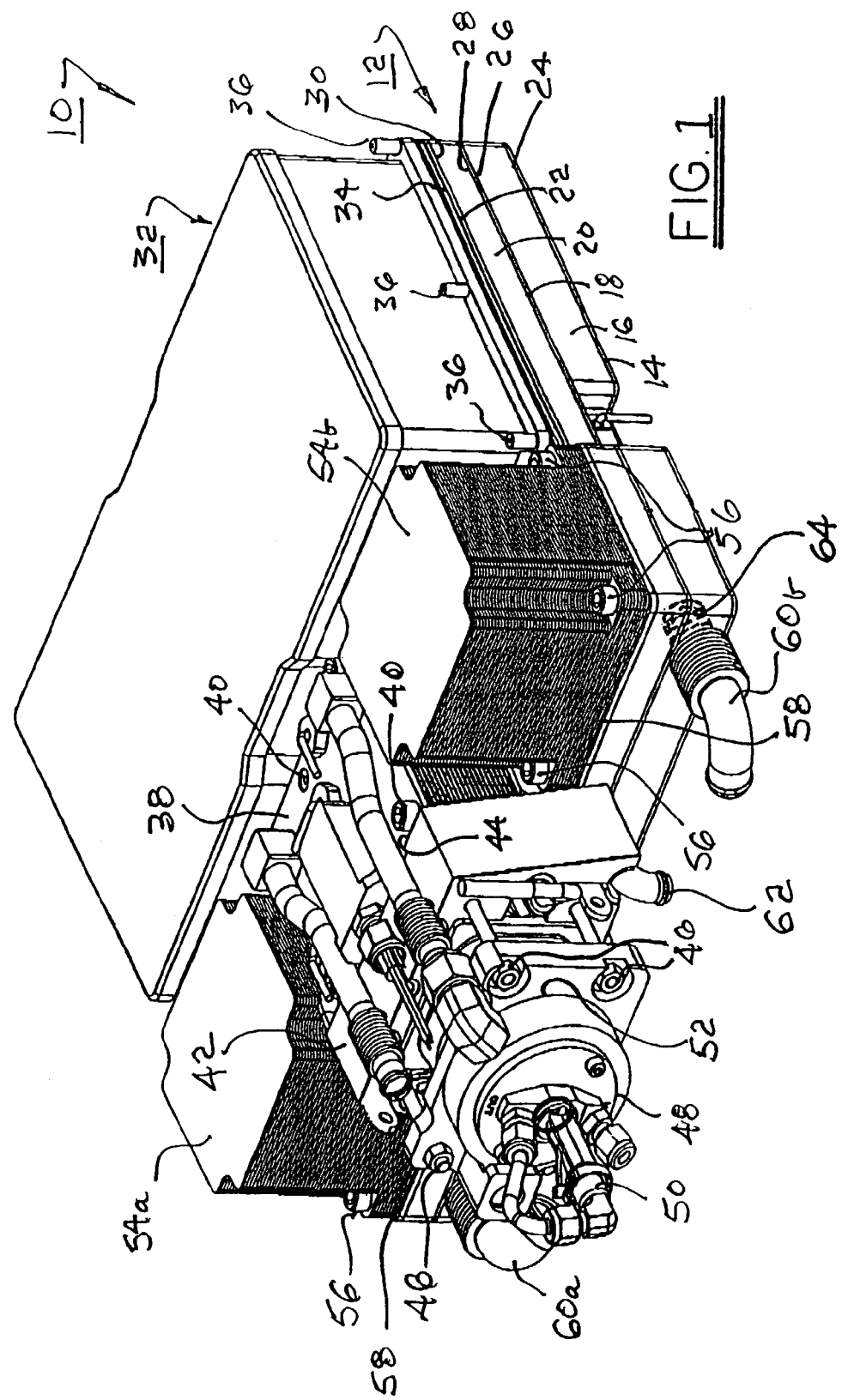
FIG. 1 is an isometric view from above of a fuel cell assembly having gasketing in accordance with the invention.

The advantage and benefit of gasketing in accordance with the invention may be best illustrated by considering the exemplary gasketing requirements of an integrated SOFC fuel cell assembly.

Referring to FIG. 1, fuel cell assembly 10 includes a plurality of sub-assemblies and components assembled together generally by bolts. An integrated base manifold 12 comprises a bottom plate 14, and lower section 16, an intermediate plate 18, an upper section 20, and a top plate 22. The plates 14, 18, 22 have patterns of apertures (not visible) formed therein which mate with other patterns of chambers (also not visible) formed in sections 16, 20 such that manifold 12 is a three-dimensional structure of interwoven flow paths for various gases. Patterned sheet gaskets 24, 26, 28, 30 in accordance with the invention are provided between the sections and plates to seal the port interfaces against leakage of gases flowing through the manifold.

Fuel cell sub-assembly 32 is mounted on manifold 12, ports (not visible) in the sub-assembly being mateable with ports (not visible) in the manifold to provide reformate from the manifold into the sub-assembly, to exhaust spent reformate from the sub-assembly, and to provide cooling air to and from the assembly. A patterned sheet gasket 34 is disposed therebetween to seal the port interfaces against gas leakage. Manifold 12 and sub-assembly 32 are bolted together by bolts 36.

Fuel cell sub-assembly 32 also contains passage joints (not visible) which are gasketed (not shown) between adjacent plates and fuel cell modules.

A hydrocarbon fuel reformer 38 is mounted to manifold 12 via bolts 40, having a patterned sheet gasket (not visible) therebetween. A fuel pre-heater and vaporization sub-assembly 42 is attached to reformer 38 for supplying heated and vaporized hydrocarbon fuel to the reformer. A patterned sheet gasket 44 is provided therebetween, and sub-assembly 42 is secured to reformer 38 via throughbolts 46.

A cover plate 48 for sub-assembly 42 supports a fuel injector 50 for the reformer. A patterned sheet gasket 52 is provided under the cover plate.

Heat exchangers 54a, 54b are mounted to manifold 12 via bolts 56, having a patterned sheet gasket 58 therebetween.

Air inlet fittings 60a, 60b, 62 are received, as for example by a threaded connection, into bores in manifold 12, the threads 64 preferably being sealed with gasket material.

The various patterned sheet gaskets and the thread-sealing material include, and preferably are formed from, fluorophlogopite mica (F-mica). F-mica, a synthetic fluorine mica believed to have the formula $KMg_3(AlSi_3O_{10})F_2$ contains no $(OH)^-$ of natural phlogopite $KMg_3(AlSi_3O_{10})(OH)_2$. The $(OH)^-$ is fully substituted with $F^-$. The fluorine mica has the following unique characteristics which are much superior to those of natural mica: high chemical stability, excellent transmittance, outgassing-free at high temperature in vacuum, excellent electrical insulation, high heat endurance (up to 1100° C.), non-radioactive background, and highly flexible and cleavable. F-mica sheets may be made by the processes of, as for example, screening, paper making, inorganic binder impregnating and hot pressing etc. F-mica sheets are known in the prior art for a variety of uses, such as substrates of thin film, windows and monochromater for x-ray, neutron diffraction, microwave and optics, spacers of electrical vacuum devices, scanning electron microscopes, and water gauges of high pressure boilers, which uses are important in industry and science. F-mica has not heretofore been used for gasketing in high-temperature fuel cells, as disclosed herein. Both sheet and tape forms of F-mica are commercially available from, for example, G.B. Group, Inc., New York, N.Y., USA, in thicknesses from 0.05 mm to 5 mm.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A fuel cell assembly comprising a plurality of components wherein at least one joint between two adjacent components is sealed by a material including fluorophlogopite mica.

2. A fuel cell assembly in accordance with claim 1 wherein said material is formed as a gasket.

3. A fuel cell assembly in accordance with claim 1 wherein said components include passages for flow of gas and wherein said joint is formed for the purpose of joining adjacent passages.

4. A fuel cell assembly in accordance with claim 1 wherein said components include a fuel cell sub-assembly, a manifold, and a hydrocarbon reformer.

5. A fuel cell assembly in accordance with claim 1 wherein said assembly is an auxiliary power unit for a vehicle.

6. A fuel cell assembly in accordance with claim 1 wherein said fluorophlogopite mica is of the formula $KMg_3(AlSi_3O_{10})F_2$.

7. A fuel cell assembly in accordance with claim 1 wherein said fuel cell sub-assembly includes a solid-oxide fuel cell.

8. A gasket for a fuel cell assembly comprising fluorophlogopite mica.

* * * * *